United States Patent
Griffith et al.

[11] Patent Number: 5,908,660
[45] Date of Patent: Jun. 1, 1999

[54] METHOD OF PREPARING HYDROPHOBIC PRECIPITATED SILICA

[75] Inventors: Phillip J. Griffith, Llandough; Brian R. Harkness; William Herron, both of Cowbridge; Rosemary M. Taylor, Barry; David J. Wilson, Penarth, all of United Kingdom

[73] Assignee: Dow Corning Corporation, Midland, Mich.

[21] Appl. No.: 08/923,073

[22] Filed: Sep. 3, 1997

[51] Int. Cl.$^6$ ........................................................ B05D 3/10
[52] U.S. Cl. ........................ 427/220; 427/221; 427/443.2; 106/490
[58] Field of Search ............................. 106/490; 427/220, 427/221, 443.2

[56] References Cited

U.S. PATENT DOCUMENTS

| | | | |
|---|---|---|---|
| 3,904,787 | 9/1975 | Trebinger et al. | 427/220 |
| 4,015,031 | 3/1977 | Reinhardt et al. | 427/213 |
| 4,072,796 | 2/1978 | Reinhardt et al. | 428/405 |
| 4,208,316 | 6/1980 | Nauroth et al. | 260/37 SB |
| 4,273,589 | 6/1981 | Nauroth et al. | 106/308 Q |
| 4,274,883 | 6/1981 | Lumbeck et al. | 106/308 Q |
| 4,308,074 | 12/1981 | Nauroth et al. | 106/309 |
| 5,009,874 | 4/1991 | Parmentier et al. | 423/335 |

FOREIGN PATENT DOCUMENTS

| | | |
|---|---|---|
| 1691303 | 11/1991 | U.S.S.R. . |
| 1710505 | 2/1992 | U.S.S.R. . |

OTHER PUBLICATIONS

Zumbrum, Acid/base properties of fumed silica fillers used in silicone elastomers; Adhes. Soc., Proc. Sixteenth Annu. Meet. Int. Symp. Interphase (1993), pp. 140–142.

*Primary Examiner*—Erma Cameron
*Attorney, Agent, or Firm*—William F. Boley

[57] ABSTRACT

A method for the preparation of hydrophobic precipitated silicas which are useful, for example, as reinforcing fillers in rubber compositions. The method comprises two steps, where in the first step an aqueous suspension of precipitated silica is contacted with an organosilicon compound in the presence of a catalytic amount of an acid to effect hydrophobing of the precipitated silica. In the second step the aqueous suspension of the hydrophobic precipitated silica is contacted with a water-immiscible organic solvent at a solvent to silica weight ratio greater than 5:1 to effect separation of the hydrophobic precipitated silica from the aqueous phase.

20 Claims, No Drawings

METHOD OF PREPARING HYDROPHOBIC PRECIPITATED SILICA

BACKGROUND OF INVENTION

The present invention is a method for the preparation of hydrophobic precipitated silicas which are useful as reinforcing fillers in rubber compositions. The method comprises two steps, where in the first step an aqueous suspension of precipitated silica is contacted with an organosilicon compound in the aqueous phase in the presence of a catalytic amount of an acid to effect hydrophobing of the precipitated silica thereby forming an aqueous suspension of a hydrophobic precipitated silica. In the second step the aqueous suspension of the hydrophobic precipitated silica is contacted with a water-immiscible organic solvent at a solvent to silica weight ratio greater than 5:1 to effect separation of the hydrophobic precipitated silica from the aqueous phase. In a preferred process the hydrophobic precipitated silica has a surface area within a range of about 100 $m^2/g$ to 750 $m^2/g$.

Although hydrophobic precipitated silicas prepared by the present method are useful in many applications such as reinforcing and extending filler in natural rubbers, thermal insulation, and as filler in floatation devices, they are particularly useful as reinforcing fillers in silicone rubber compositions. It is well known that silicone rubbers formed from the vulcanization of polydiorganosiloxane fluids or gums alone generally have low elongation and tensile strength values. One means for improving the physical properties of such silicone rubbers involves the incorporation of a reinforcing silica filler into the fluid or gum prior to curing. It is known to use treated pyrogenic silica as a reinforcing filler in such silicone rubbers. However, pyrogenic silica has the disadvantage of being expensive. Therefore, it would be advantageous to replace at least a portion of the pyrogenic silica used in such applications with a precipitated silica.

Attempts to substitute precipitated silica for pyrogenic silica in curable silicone rubber compositions have not been entirely successful for a number of reasons. Precipitated silica has in common with pyrogenic silica the tendency to interact with the polydiorganosiloxane fluid or gum causing a phenomenon typically referred to as "crepe hardening". A great deal of effort has been made in the past to treat the surface of reinforcing silica fillers, both pyrogenic and precipitated silica, with organosilanes or organosiloxanes to make the surface of the silica hydrophobic. This surface treatment reduces or diminishes the tendency of the compositions to crepe harden and improves the physical properties of the cured silicone rubber. Processes for treating precipitated silica have typically been difficult to conduct on a commercial scale. The present method is one that can economically be conducted on a commercial scale to make hydrophobic precipitated silica.

Treblinger et al., U.S. Pat. No. 3,904,787, describe the treatment of a precipitated silica in aqueous suspension with an organohalosilane at a temperature within a range of 15° C. to 70° C. The hydrophobic precipitated silica is filtered, washed, dried, and tempered by heating in the range of 200° C. to 500° C.

Reinhardt et al., U.S. Pat. No. 4,015,031, describe a process where a precipitated silica in powdered form is heated to a temperature of about 200° C. to 300° C. with agitation to fluidize and then treated dropwise with an organosilane which is stable and boils below 300° C.

Reinhardt et al., U.S. Pat. No. 4,072,796, describe a process where an acidic wet suspension of precipitated silica at a temperature of about 50° C. to 90° C. is hydrophobed with a prepolycondensed organohalosilane or a prepolycondensed mixture of organohalosilanes. The hydrophobed precipitated silica is filtered, washed, dried, and tempered at about 300° C. to 400° C.

Nauroth et al., U.S. Pat. No. 4,208,316, U.S. Pat. No. 4,273,589 and U.S. Pat. No. 4,308,074, describe the treatment of dried precipitated silica with organosilicon compound hydrophobing agents in a ratio of 10:0.5 to 10:3. The product obtained thereby is tempered for 60 to 180 minutes, preferably 70 to 130 minutes, at a temperature of 200° C. to 400° C.

Parmentier et al., U.S. Pat. No. 5,009,874, describe a method for making a hydrophobic, essentially spheroidal precipitated silica, useful as a reinforcing filler in silicone elastomers. In a first step the precipitated silica in aqueous suspension is hydrophobed with an organosilicon compound. In a second step a water immiscible organic solvent is added to effect separation of the hydrophobic precipitated silica from the aqueous phase. The water immiscible organic solvent is added to the process at a volume(L) to weight (Kg) ratio of silica of from 1 to 5 and preferably from 1.5 to 4.5.

SUMMARY OF INVENTION

The present invention is a method for the preparation of hydrophobic precipitated silicas which are useful, for example, as reinforcing fillers in rubber compositions. The method comprises two steps, where in the first step an aqueous suspension of precipitated silica is contacted with an organosilicon compound in the presence of a catalytic amount of an acid to effect hydrophobing of the precipitated silica. In the second step the aqueous suspension of the hydrophobic precipitated silica is contacted with a water-immiscible organic solvent at a solvent to silica weight ratio greater than 5:1 to effect separation of the hydrophobic precipitated silica from the aqueous phase. In a preferred process the hydrophobic precipitated silica has a surface area within a range of about 100 $m^2/g$ to 750 $m^2/g$.

DESCRIPTION OF INVENTION

The present invention is a method for preparing a hydrophobic precipitated silica. The method comprises:

(A) contacting an aqueous suspension of a precipitated silica with (1) a catalytic amount of an acid and (2) an organosilicon compound selected from the group consisting of organosilanes described by formula $$R^1_a H_b SiX_{4-a-b}, \quad (1)$$

and organosiloxanes described by formula $$R^2_n SiO_{(4-n)/2}, \quad (2)$$

where each $R^1$ is an independently selected hydrocarbon radical comprising 1 to about 12 carbon atom, each $R^2$ is independently selected from the group consisting of hydrogen, hydroxy, and hydrocarbon radicals comprising 1 to about 12 carbon atoms with the proviso that at least 50 mole percent of the $R^2$ substituents are hydrocarbon radicals, each X is independently selected from the group consisting of halogen and alkoxy radicals comprising 1 to about 12 carbon atoms, a=1, 2, or 3; b=0 or 1; a+b=1, 2, or 3 with the proviso that when b=1 then a+b=2 or 3; and n is an integer from 2 to 3 inclusive, to form an aqueous suspension of a hydrophobic precipitated silica and (B) contacting the aqueous suspension of the hydrophobic precipitated silica with a water-immiscible organic solvent at a solvent to silica weight ratio greater than 5:1 thereby effecting separation of the hydrophobic precipitated silica from the aqueous suspension.

In step (A) of the present method an aqueous suspension of a precipitated silica is hydrophobed with an organosilicon compound. By "precipitated silica" it is meant aggregated particles of colloidal amorphous silica that have not at any point existed as a silica gel during their preparation. The precipitated silica may be obtained by standard methods known in the art for producing such silicas. The precipitated silica may be made by combining an aqueous solution of a soluble metal silicate, ordinarily an alkali metal silicate such as sodium silicate, and an acid so that colloidal particles grow in a weakly alkaline solution and are coagulated by the alkali metal ions of the resulting soluble alkali metal salt. Various acids may be used to facilitated formation of the precipitated silica, including mineral acids such as hydrogen chloride and sulfuric acid and/or carbon dioxide. Precipitated silicas prepared by such methods may be treated by one or more procedures such as washing, filtering, drying, and heating at elevated temperature prior to use in the present method. Preferred is when the precipitated silica has been washed to remove alkali metal ions therefrom. If desired, the precipitated silica used in the present method may be subjected to a shearing force to reduce aggregate particle size and to improve the uniformity of the particle size distribution, prior to conduct of the present method. The shearing force may be applied, for example, by a mechanical means such as a high-speed mixer or by ultrasound.

The BET surface area of the precipitated silica used in the present method is not critical and can generally be within a range of about 50 $m^2$/g to greater than 1000 $m^2$/g. However, a preferred silica for use in the present method, particularly when the precipitated silica is to be used as a reinforcing filler in rubber compositions, is within a range of about 100 $m^2$/g to 750 $m^2$/g.

The precipitated silica is added to step (A) of the present method as an aqueous suspension. The concentration of precipitated silica in the aqueous suspension is not critical and can be within a range of about 5 to 90 weight percent. Preferred is when the concentration of precipitated silica in the aqueous suspension is within a range of about 10 to 50 weight percent. Most preferred is when the concentration of precipitated silica in the aqueous suspension is within a range of about 10 to 30 weight percent.

In step (A) of the present method the aqueous suspension of precipitated silica is contacted with one or more of the organosilicon compounds described by formulas (1) and (2) in the presence of a catalytic amount of an acid. The acid catalyst can be, for example, a mineral acid such as hydrochloric, hydroiodic, sulfuric, nitric, benzene sulfonic, and phosphoric acid. When the organosilicon compound is, for example, a chlorosilane, the catalytic amount of the acid may be generated in situ by hydrolysis of the chlorosilane or the reaction of the chlorosilane directly with hydroxyls of the precipitated silica. In step (A) it is only necessary that the acid be present in an amount sufficient to effect reaction of the organosilicon compound with the precipitated silica. In step (A) it is preferred that the acid catalyst provide a pH less than about pH 6. More preferred is when the acid catalyst provides a pH less than about pH 3.

The temperature at which step (A) is conducted is not critical and can be within a range of about 20° C. to 250° C. Generally, it is preferred that step (A) be conducted at a temperature within a range of about 30° C. to 150° C. Step (A) can be conducted at the reflux temperature of the water-miscible solvent or water-immiscible organic solvent when present.

During the conduct of step (A) it may be desirable to add a surfactant or water-miscible solvent to facilitate the reaction of the organosilicon compound with the precipitated silica. The surfactant or water-miscible solvent may be added in the presence or absence of any water-immiscible organic solvent added to the method. Suitable surfactants include, for example, anionic surfactants such as dodecylbenzene sulfonic acid, nonionic surfactants such as polyoxyethylene(23)lauryl ether and $(Me_3SiO)_2MeSi(CH_2)_3(OCH_2CH_2)_7OMe$ where Me is methyl, and cationic surfactants such as N-alkyltrimethyl ammonium chloride. Suitable water-miscible solvents include, for example, alcohols such as ethanol, isopropanol, and tetrahydrofuran.

In step (A) of the present method the precipitated silica is reacted with one or more organosilicon compounds described by formulas (1) and (2). In formula (1) each $R^1$ can be an independently selected hydrocarbon radical comprising 1 to about 12 carbon atoms. $R^1$ can be a saturated or unsaturated monovalent hydrocarbon radical. $R^1$ can be a substituted or non-substituted monovalent hydrocarbon radical. $R^1$ can be, for example, alkyl radicals such as methyl, ethyl, propyl, t-butyl, hexyl, heptyl, octyl, decyl, and dodecyl; alkenyl radicals such as vinyl, allyl, and hexenyl; substituted alkyl radicals such as chloromethyl, 3,3,3-trifluoropropyl, and 6-chlorohexyl; and aryl radicals such as phenyl, naphthyl, and tolyl. $R^1$ can be an organofunctional hydrocarbon radical comprising 1 to about 12 carbon atoms where, for example the functionality is mercapto, disulfide, polysulfide, amino, carboxylic acid carbinol ester, or amido. A preferred organofunctional hydrocarbon radical is one having disulfide or polysulfide functionality.

In formula (1) each X is independently selected from the group consisting of halogen and alkoxy radicals comprising 1 to about 12 carbon atoms. When X is a halogen, it is preferred that the halogen be chlorine. When X is an alkoxy radical, X may be, for example, methoxy, ethoxy, and propoxy. Preferred is where each X is selected from the group consisting of chlorine atoms and methoxy.

In formula (2) each $R^2$ is independently selected from the group consisting of hydrogen, hydroxy, and hydrocarbon radicals comprising 1 to about 12 carbon atoms, with the proviso that at least 50 mole percent of the $R^2$ substituents are hydrocarbon radicals. $R^2$ can be the same as $R^1$ as described above. The organosiloxanes described by formula (2) can be, for example, linear or cyclic in structure. The viscosity of the organosiloxanes described by formula (2) is not limiting and can range from that of a fluid to a gum. Generally, higher molecular weight organosiloxanes will be cleaved by the acidic conditions of the present method allowing them to react with the precipitated silica.

Examples of useful organosilicon compounds include diethyldichlorosilane, allylmethyldichlorosilane, methylphenyldichlorosilane, phenylethyldiethoxysilane, 3,3,3-trifluoropropylmethyldichlorosilane, trimethylbutoxysilane, symdiphenyltetramethyldisiloxane, trivinyltrimethylcyclotrisiloxane, octamethylcyclotetrasiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichlorosilane, mercaptopropylmethyldimethoxysilane, bis{3-(triethoxysilyl)propyl}tetrasulfide, polydimethylcyclosiloxanes comprising 3 to about 20 dimethylsiloxy units and preferably 3 to about 7 dimethylsiloxy units, and trimethylsiloxy or hydroxydimethylsiloxy endblocked polydimethylsiloxane polymers having a viscosity within a range of about 1 mPa.s to 1,000 mPa.s at 25° C.

The amount of organosilicon compound added to the method is that sufficient to adequately hydrophobe the precipitated silica to provide a hydrophobic precipitated silica suitable for its intended use. Generally, the organosilicon compound should be added to the method in an amount such that there is at least 0.04 organosilyl unit per $SiO_2$ unit in the precipitated silica. The upper limit of the amount of organosilicon compound added to the process is not critical since any amount in excess of the amount required to saturate the precipitated silica will act as a solvent for the method.

In step (B) of the present method a water-immiscible organic solvent is added at a solvent to silica weight ratio greater than 5:1 to effect separation of the hydrophobic precipitated silica from the aqueous suspension. In a preferred method, step (A) of the method is conducted and then step (B) is subsequently conducted. However, in the present method the water-immiscible organic solvent can be added prior to, simultaneously with, or subsequent to the addition of the organosilicon compound of step (A). In the first two situations the conversion of the precipitated silica to a hydrophobic precipitated silica is accompanied by a phase separation in which the hydrophobic silica separates into the solvent phase.

For purpose of this invention any organic solvent immiscible with water can be employed. Suitable water-immiscible organic solvents include low molecular weight siloxanes such as hexamethyldisiloxane, octamethylcyclotetrasiloxane, diphenyltetramethyldisiloxane and trimethylsiloxy endblocked polydimethylsiloxane fluids. When a siloxane is employed as a solvent it may serve both as a solvent and as a reactant with the precipitated silica. In addition, suitable water-immiscible organic solvents include aromatic hydrocarbons such as toluene and xylene; heptane, and other aliphatic hydrocarbon solvents; cycloalkanes such as cyclohexane; ethers such as diethylether and dibutylether; halohydrocarbon solvents such as methylene chloride, chloroform, ethylene chloride, and chlorobenzene; and ketones such as methylisobutylketone.

The amount of water-immiscible organic solvent added to the present method provides a solvent to silica weight ratio greater than 5:1. At solvent to silica weight ratios less than about 5:1 the hydrophobic precipitated silica tends to flocculate in the solvent and not form a true precipitate. At solvent to silica weight ratios greater than 5:1 the hydrophobic precipitated silica precipitates into the organic solvent phase thereby effecting separation from the aqueous suspension. The upper limit for the amount of water-immiscible solvent added to the method is limited only by economic considerations such as solvent cost, solvent recovery or disposal expense, and equipment capacity. Preferred is when the weight ratio of solvent to silica is greater than about 6:1. Even more preferred is when the weight ratio of solvent to silica is within a range of about 6:1 to 10:1.

It is preferred that the water-immiscible organic solvent have a boiling point below about 250° C. to facilitate its removal from the hydrophobic precipitated silica. However, the boiling point of the water-immiscible organic solvent is not critical since the solvent may be removed from the hydrophobic silica by filtration, centrifuging, or other suitable means.

In step (B), the water-immiscible organic solvent is added to the method thereby effecting separation of the hydrophobic precipitated silica from the aqueous suspension. The hydrophobic precipitated silica is recovered in the solvent phase to provide a product which may be used, if desired, without further treatment. Alternatively, the hydrophobic precipitated silica may be washed to reduce contaminates. The hydrophobic precipitated silica may be recovered from the solvent, dried, and further treated by such methods as heating.

The following examples are provided to illustrate the present method. The examples are not intended to limit the claims herein.

EXAMPLE 1

Precipitated silica was hydrophobed with dimethyldichlorosilane. Into a 100 ml flask was added 26 g of Degussa FK320DS precipitated silica (98% $SiO_2$, surface area 175 $m^2$/g, tapped density 75 g/l, manufactured by Degussa AG, Frankford/Main, Federal Republic of German), 150 g of distilled water, and 51 g of isopropanol. The resulting aqueous suspension was stirred for 5 minutes and then 11 g of dimethyldichlorosilane was added drop-wise to the stirring suspension over a 3 minute period. Then the suspension, with stirring, was heated to reflux for 30 minutes. To the cooled suspension was added 200 ml of toluene. The resulting two-phase system was stirred to transfer the hydrophobic silica to the toluene phase. The aqueous phase was separated from the toluene phase in a separatory funnel. The toluene phase containing the hydrophobic precipitated silica was washed 3 time with 300 ml of distilled water. Residual water was removed from the washed toluene phase by azeotropic distillation, followed by distillation to remove the toluene. The recovered hydrophobic precipitated silica was dried in an oven at 130° C. for 24 hours. The dried hydrophobic precipitated silica was analyzed by CHN analysis using a Perkin Elmer Model 2400 CHN Elemental Analyzer (Perkin Elmer Corporation, Norwalk, Conn.) for carbon content. The dried hydrophobic precipitated silica was determined to comprise 5 weight percent carbon.

EXAMPLE 2

Precipitated silica was hydrophobed with octamethylcyclotetrasiloxane. Into a 100 ml flask was added 26 g of Degussa FK320DS precipitated silica (Degussa Corporation), 150 g of distilled water, 64 g of isopropanol, 28 g of concentrated hydrochloric acid, and 9.6 g of octamethylcyclotetrasiloxane. The resulting aqueous suspension was stirred for 5 minutes and then heated to reflux for 30 minutes. To the cooled suspension was added 200 ml of toluene. The resulting two-phase system was stirred to transfer the hydrophobic silica to the toluene phase as a precipitate. The aqueous phase was separated from the toluene phase in a separatory funnel. The toluene phase containing the hydrophobic precipitated silica was washed 3 times with 300 ml of distilled water. Residual water was removed from the washed toluene phase by azeotropic distillation, followed by distillation to remove the toluene. The recovered hydrophobic precipitated silica was dried in an oven at 130° C. for 24 hours. The dried hydrophobic precipitated silica was analyzed by CHN analysis for carbon content. The dried hydrophobic precipitated silica was determined to comprise 6.8 weight percent carbon.

We claim:

1. A method for preparing a hydrophobic precipitated silica, the method comprising:
   (A) contacting an aqueous suspension of a precipitated silica with (1) a catalytic amount of an acid and (2) an organosilicon compound selected from the group consisting of organosilanes described by formula

and organosiloxanes described by formula

where each $R^1$ is an independently selected hydrocarbon radical comprising 1 to about 12 carbon atoms, each $R^2$ is independently selected from the group consisting of hydrogen, hydroxy, and hydrocarbon radicals comprising 1 to about 12 carbon atoms with the proviso that at least 50 mole percent of the $R^2$ substituents are hydrocarbon radicals, each X is independently selected from the group consisting of halogen and alkoxy radicals comprising 1 to about 12 carbon atoms, a=1, 2, or 3; b=0 or 1; a+b=1, 2, or 3 with the proviso that when b=1 then a+b=2 or 3; and n is an integer from 2 to 3 inclusive, to form an aqueous suspension of a hydrophobic precipitated silica and (B) contacting the aqueous suspension of the hydrophobic precipitated silica with a water-immiscible organic solvent at a solvent to silica weight ratio greater than 5:1 thereby effecting separation of the hydrophobic precipitated silica from the aqueous suspension.

2. A method according to claim 1, where the precipitated silica is subject to a shearing force to reduce aggregate particle size and to improve uniformity of the particle size distribution prior to conduct of the method.

3. A method according to claim 1, where the precipitated silica has a surface area within a range of about 100 m²/g to 750 m²/g.

4. A method according to claim 1, where the precipitated silica comprises about 5 to 90 weight percent of the aqueous suspension.

5. A method according to claim 1, where the precipitated silica comprises about 10 to 50 weight percent of the aqueous suspension.

6. A method according to claim 1, where the precipitated silica comprises about 10 to 30 weight percent of the aqueous suspension.

7. A method according to claim 1, where the catalytic amount of the acid provides for a pH less than about 6 for the aqueous suspension of the precipitated silica.

8. A method according to claim 1, where the catalytic amount of the acid provides for a pH less than about 3 for the aqueous suspension of the precipitated silica.

9. A method according to claim 1, where the contacting of the aqueous suspension of the precipitated silica with the acid and the organosilicon compound is conducted at a temperature within a range of about 30° C. to 150° C.

10. A method according to claim 1, where step (A) further comprises the presence of a surfactant to facilitate the reaction of the organosilicon compound with the precipitated silica.

11. A method according to claim 1, where step (A) further comprises the presence of a water-miscible solvent to facilitate the reaction of the organosilicon compound with the precipitated silica.

12. A method according to claim 11, where the water-miscible solvent is isopropanol.

13. A method according to claim 1, where $R^1$ is an organofunctional hydrocarbon radical having disulfide or polysulfide functionality.

14. A method according to claim 1, where the organosilicon compound is added to the method in an amount that provides at least 0.04 organosilyl unit per $SiO_2$ unit in the precipitated silica.

15. A method according to claim 1, where the water-immiscible organic solvent is a low molecular weight siloxane.

16. A method according to claim 1, where the water-immiscible organic solvent is toluene.

17. A method according to claim 1, where the weight ratio of the water-immiscible organic solvent to silica is greater than about 6:1.

18. A method according to claim 1, where the weight ratio of the water-immiscible organic solvent to silica is within a range of about 6:1 to 10:1.

19. A method according to claim 1, where the organosilicon compound is dimethyldichlorosilane.

20. A method according to claim 1, where the organosilicon compound is octamethylcyclotetrasiloxane.

* * * * *

UNITED STATES PATENT AND TRADEMARK OFFICE
CERTIFICATE OF CORRECTION

PATENT NO. : 5,908,660
DATED : June 1, 1999
INVENTOR(S) : Phillip J. Griffith, et al.

It is certified that error appears in the above-indentified patent and that said Letters Patent is hereby corrected as shown below:

On the title page, item [54] and Column 1:

In the Title, the term "OF" should read "FOR."

Signed and Sealed this

Sixteenth Day of November, 1999

Attest:

Q. TODD DICKINSON

*Attesting Officer*     *Acting Commissioner of Patents and Trademarks*